Patented June 14, 1949

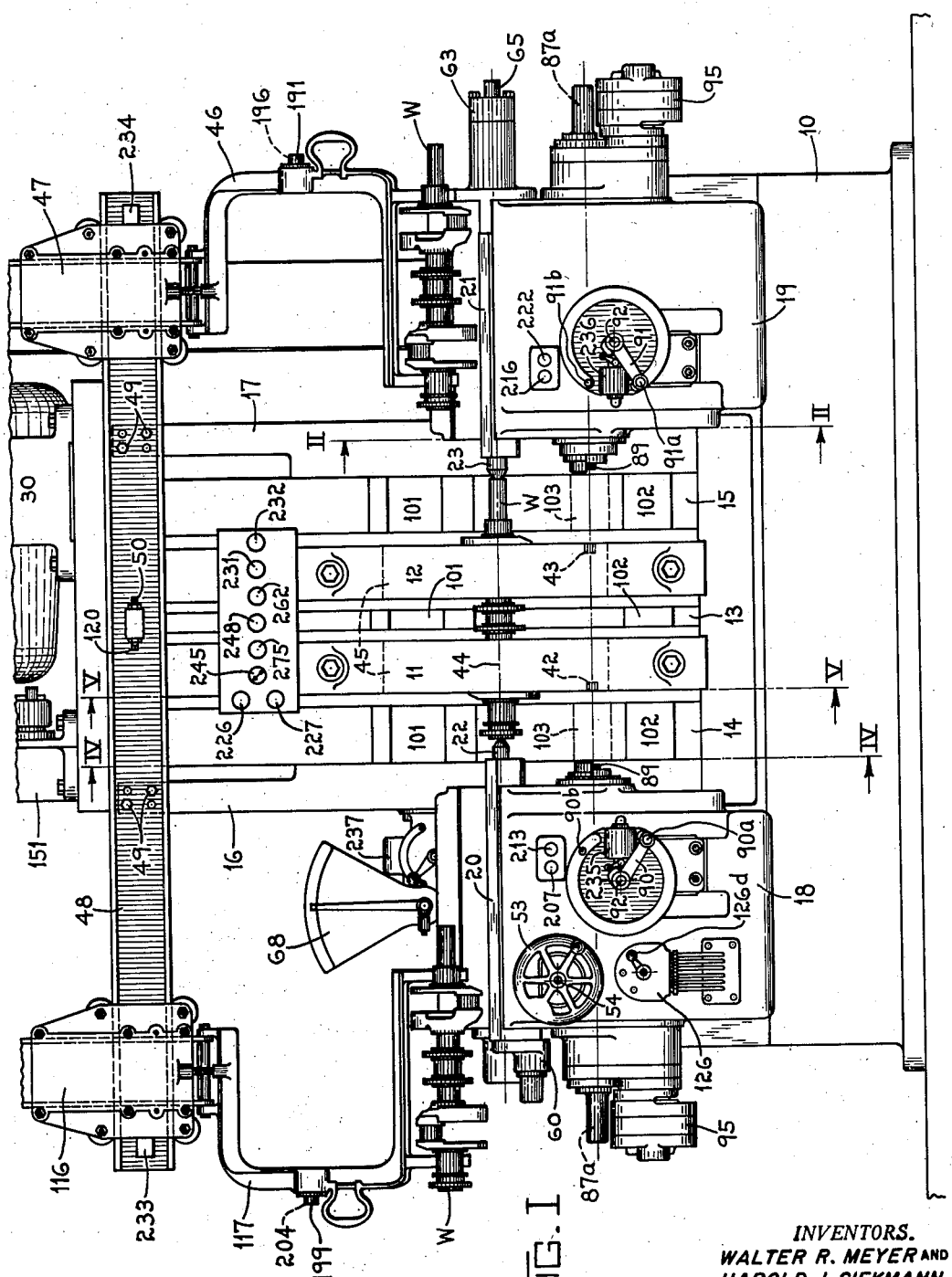

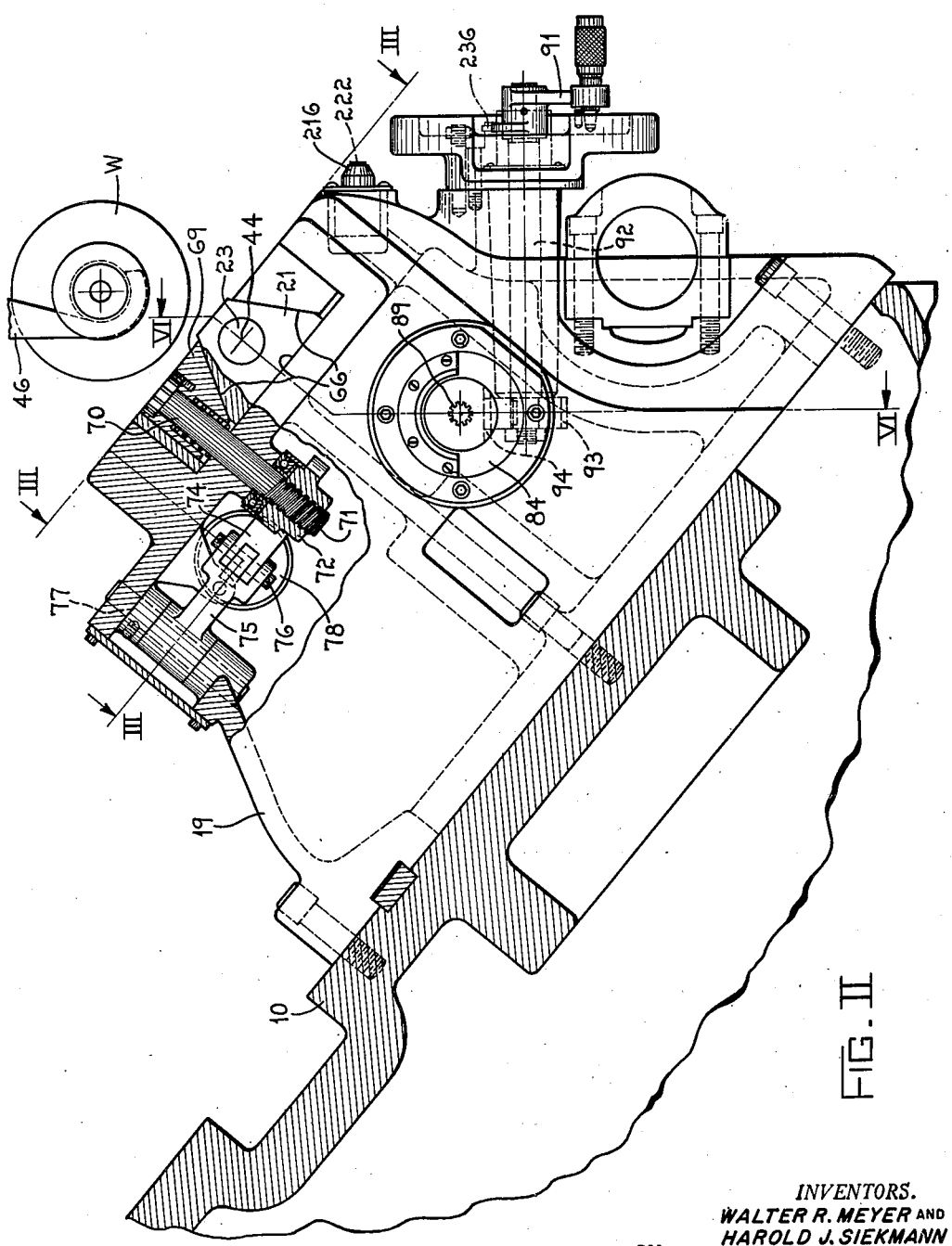

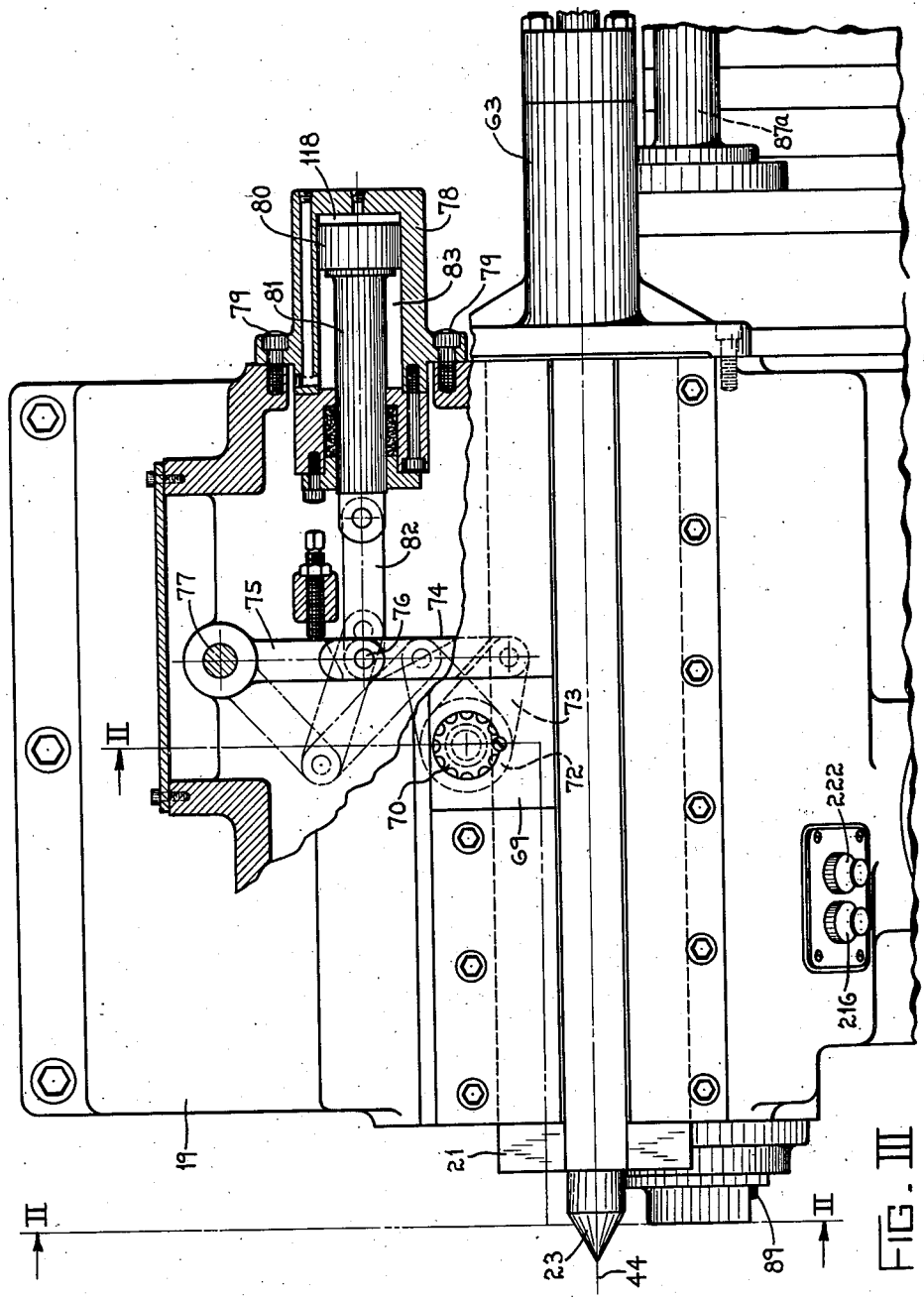

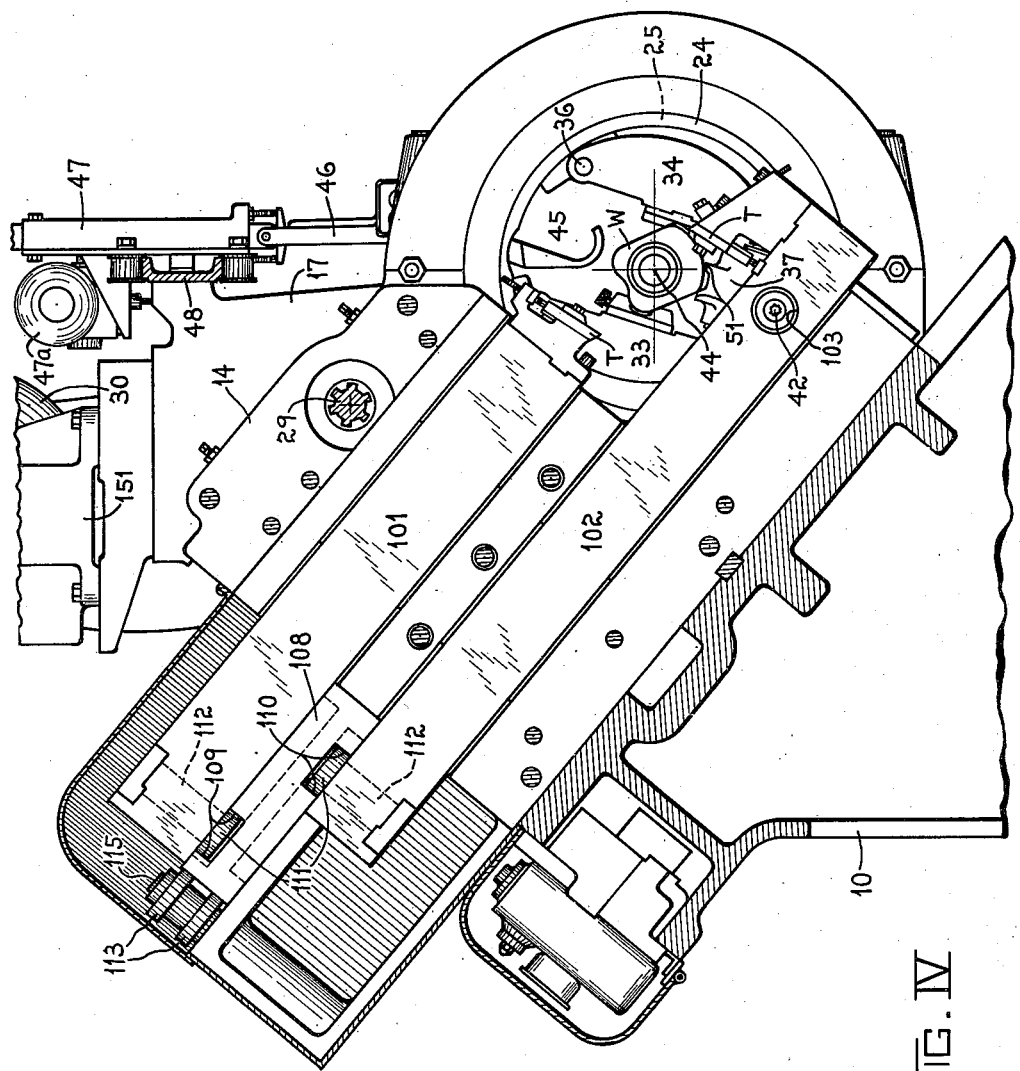

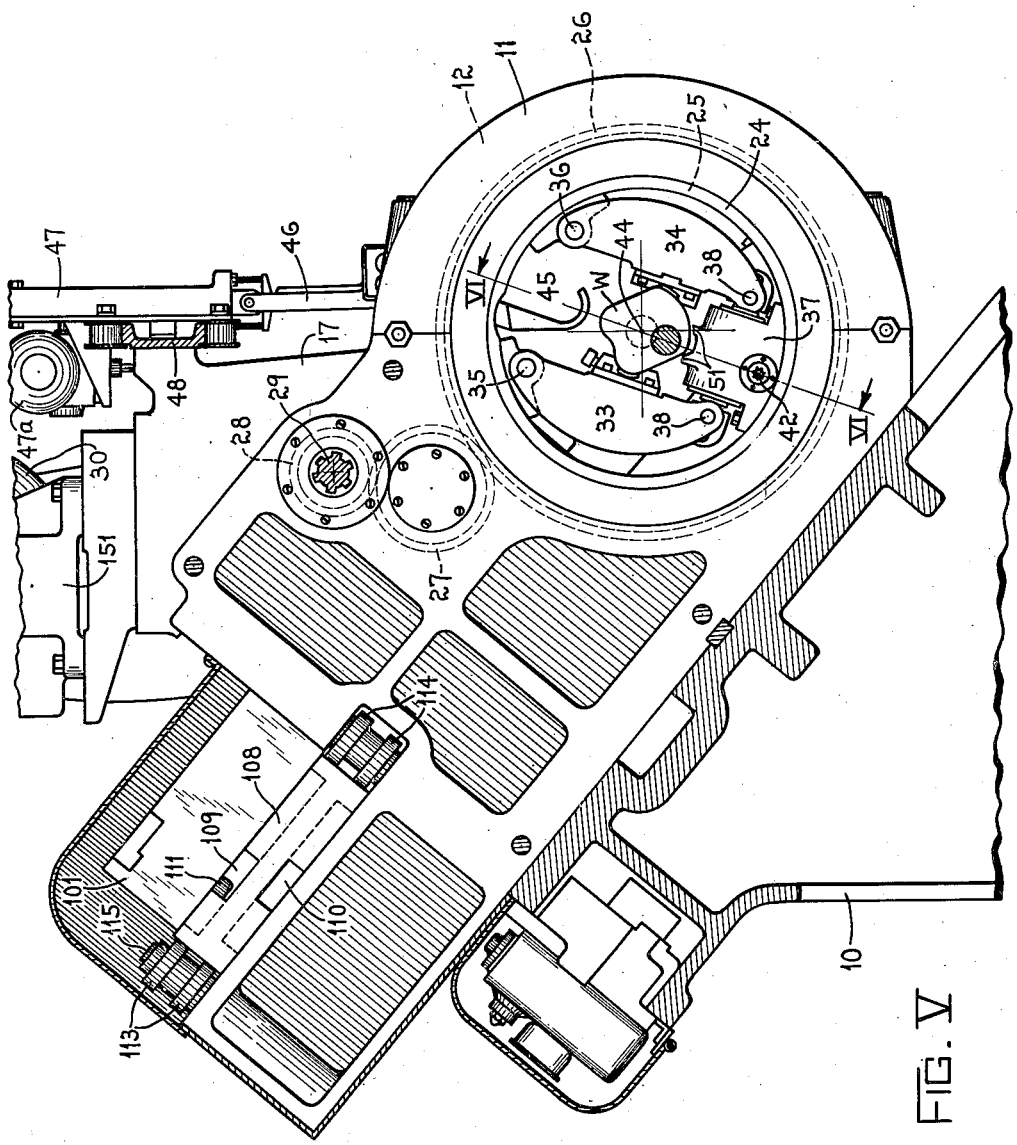

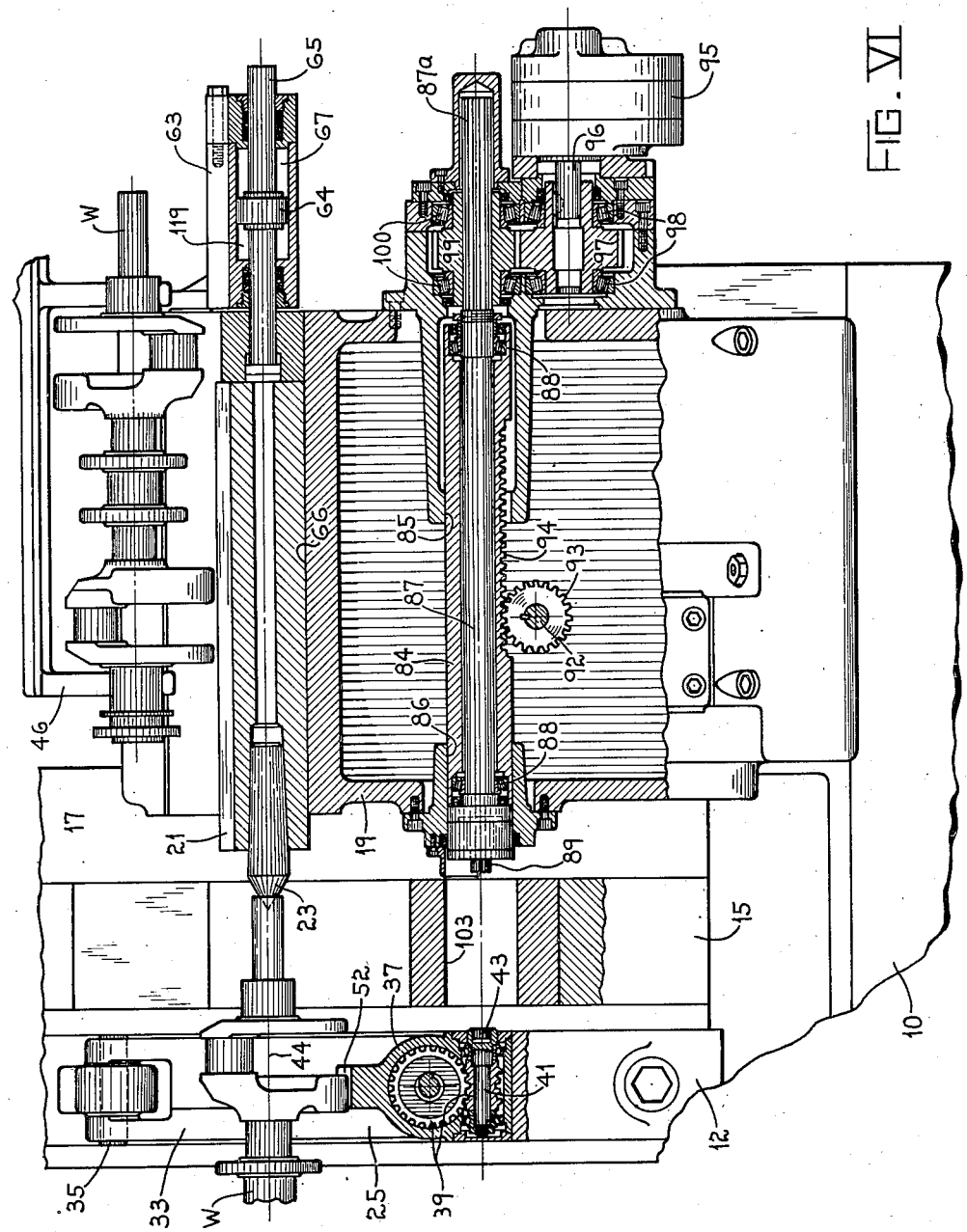

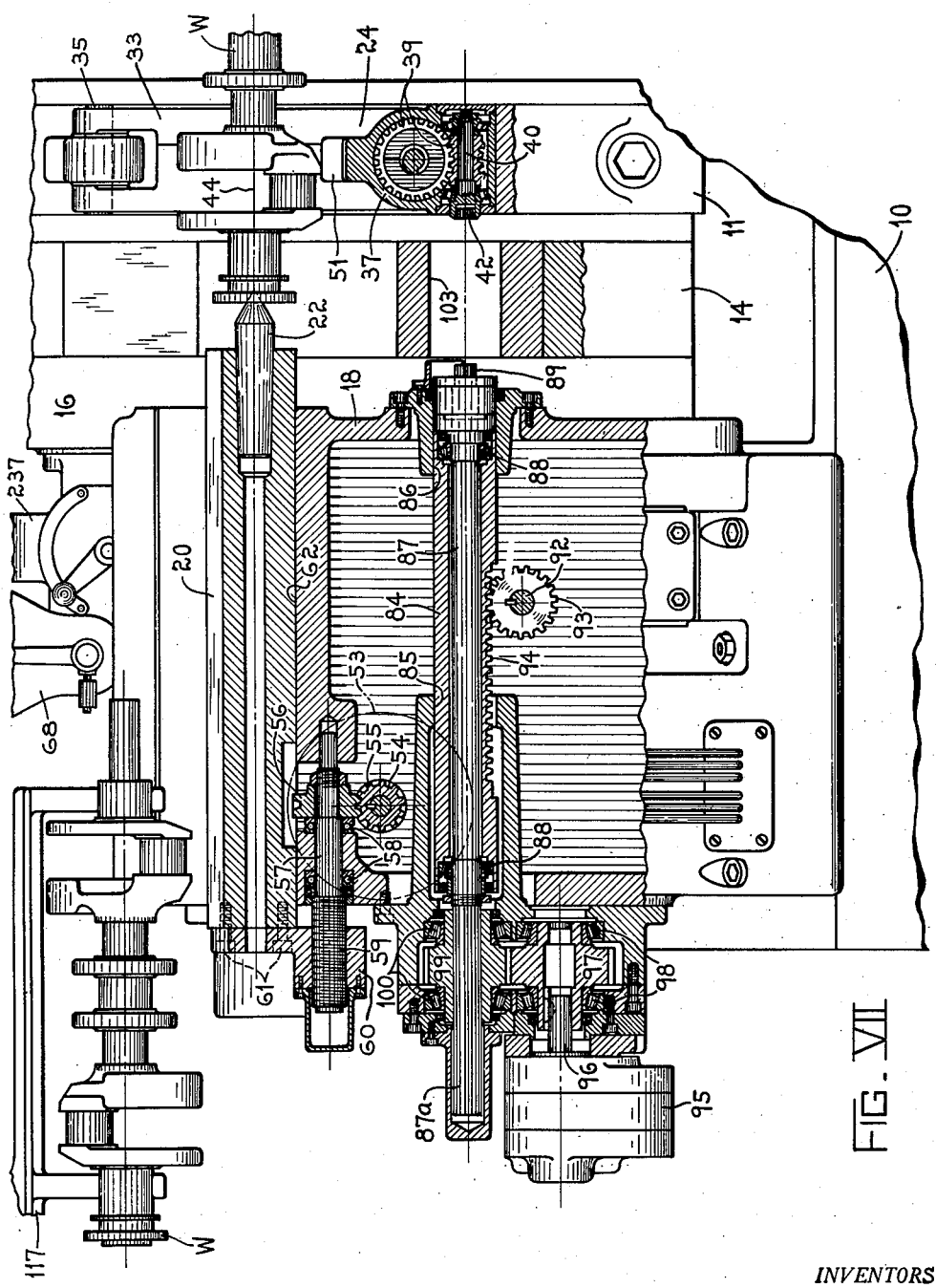

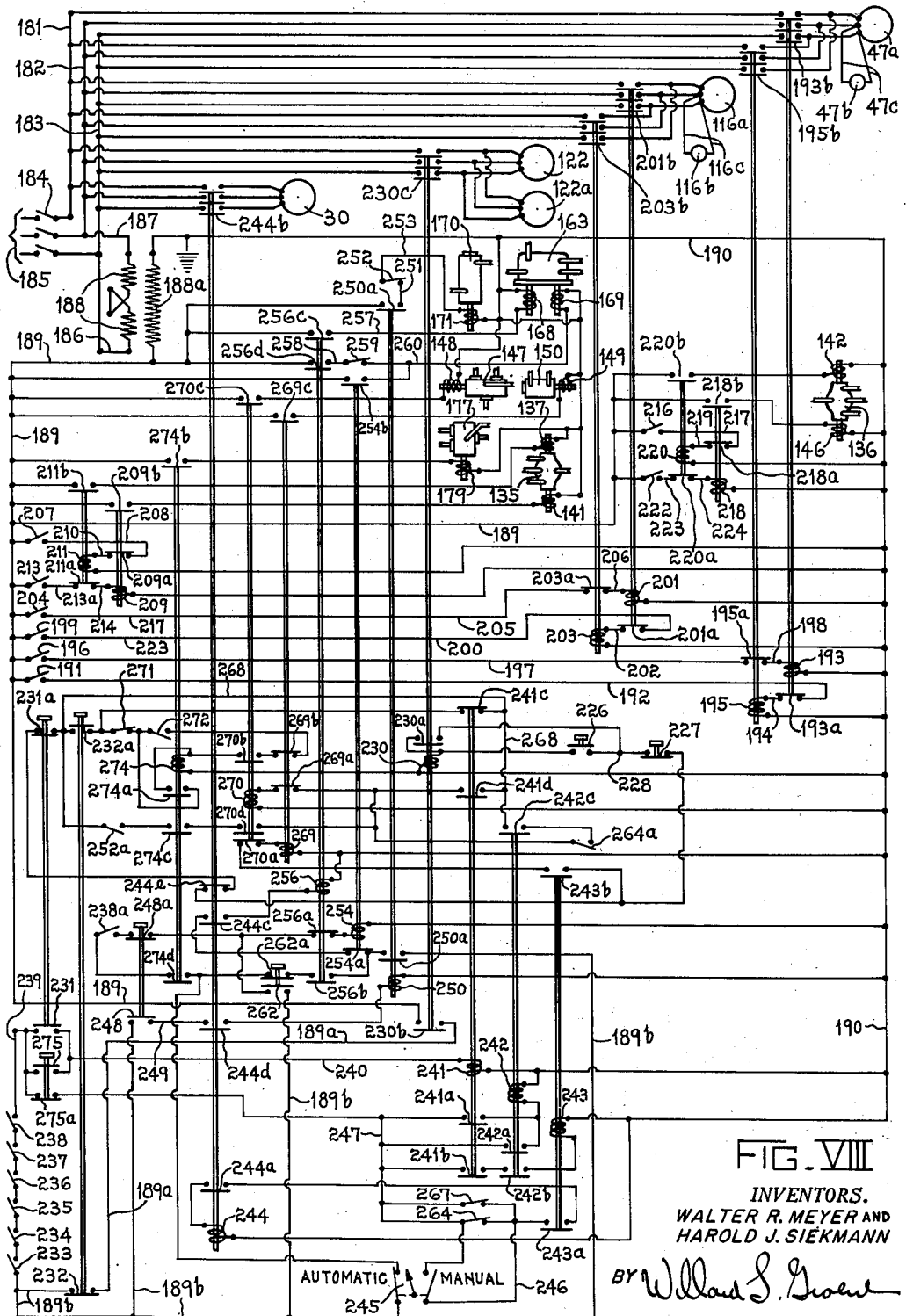

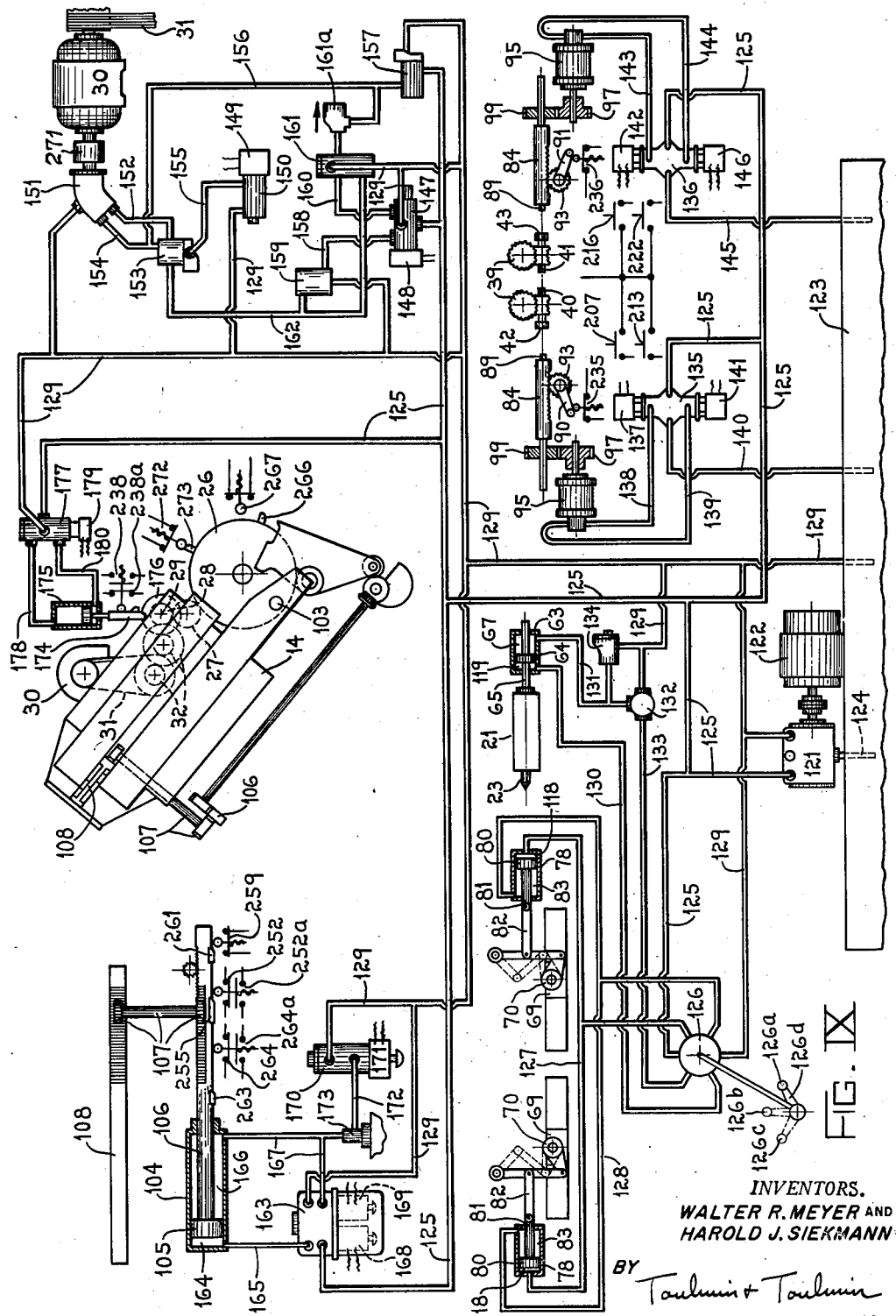

2,473,108

UNITED STATES PATENT OFFICE 2,473,108

CENTER DRIVE LATHE POWER CHUCKING MECHANISM

Walter R. Meyer and Harold J. Siekmann, Cincinnati, Ohio, assignors to The R. K. Le Blond Machine Tool Company, Cincinnati, Ohio, a corporation of Delaware Application December 5, 1945, Serial No. 632,910

1 Claim. (Cl. 82—9)

This invention pertains to machine tools and is particularly directed to improvements in crankshaft lathes. More particularly, this invention is directed to an improved power chucking mechanism together with coordinated operating and control mechanism to facilitate the loading and chucking of work pieces in center drive crankshaft lathes.

One of the objects of this invention is to provide an improved system of interlocked control for a center drive crankshaft lathe to more efficiently effect the loading, clamping, and machining of work pieces in the lathe.

Another object is to provide an improved power chucking mechanism for a center drive crankshaft lathe.

Still another object is to provide a method of loading and chucking a crankshaft in a center drive crankshaft lathe which requires a minimum of physical effort and thought upon the part of the operator of the machine.

A further object of this invention is to provide power chucking mechanism in the tailstocks of a center drive crankshaft lathe arranged to operate the work gripping and chucking devices in the center drive work spindles of the lathe.

It is also an object to provide a novel arrangement for loading and power chucking a work piece or crankshaft in a double center drive crankshaft lathe.

And it is a still further object to provide an improved machine organization for a double center drive crankshaft lathe to facilitate the rapid loading, unloading, and accurate and positive chucking of the work in the lathe.

Further features and advantages of this invention will appear from a detailed description of the drawings in which:

Figure I is a front elevation of a double center drive crankshaft lathe incorporating the features of this invention.

Figure II is an enlarged fragmentary view of the right-hand tailstock of the center drive lathe partly in section on the line II—II of Figures I and III.

Figure III is a top view of the tailstock indicated by the line III—III of Figure II.

Figure IV is a vertical transverse enlarged fragmentary section through the machine on the line IV—IV of Figure I, particularly showing the construction of a tool carrier unit.

Figure V is a vertical transverse enlarged fragmentary sectional view through the machine on the line V—V of Figure I, particularly showing the construction of a center drive work spindle carrier unit.

Figure VI is an enlarged fragmentary diagrammatic section through the right-hand tailstock and the right-hand center drive work spindle chuck mechanism indicated by the line VI—VI of Figures II and V.

Figure VII is an enlarged fragmentary diagrammatic view through the left-hand tailstock and the left-hand center drive work spindle chuck mechanism similar to the view indicated in Figure VI.

Figure VIII is an elementary electric circuit diagram for the control mechanism of the machine.

Figure IX is the hydraulic circuit diagram of the operating mechanism for the machine.

General machine organization

In the chucking of work pieces, such as crankshafts, having rough irregular webs which are to be gripped by the chuck jaws, difficulty is experienced in that the eqalizing chuck mechanism, which must necessarily be used under such conditions, must be properly and firmly clamped to the work so that there will be no tendency for the work to slip in the chucks when heavy cutting operations are being performed on the work. This problem is particularly present when chucking a crankshaft in a double center drive lathe because the cutting forces applied to the work in such a machine are extremely large. The loading of the crankshaft into the center drive work spindles also presents the problem of arranging the chucking members or work engaging members so as to allow axial insertion of the crankshafts in the center drive spindles prior to gripping them by the chucking mechanism. Definite limitations of the space in the center drive gears by the tailstocks and by the cutting tools which operate each side of and between the center drive chucks makes it difficult to provide adequate means for clamping the chucks to the work. Accessibility, therefore, becomes a paramount question which must be considered while at the same time allowing adequate clamping force to be applied to the chucking devices to firmly grip the crankshaft in the lathe.

Tailstocks must also be provided each side of the center drive work spindles which support the end portions of the crankshaft and initially position the work during the gripping of the crankshaft in the center drive chucks. Therefore, various problems of providing an adequate machine arrangement to facilitate the loading and unloading of the work into the center drive gears, together with means for applying proper clamping force to the chucks to grip the crankshaft in the lathe for the cutting operation, must be carefully considered. These problems are met by applicants, machine organization and method of loading, unloading, and gripping the crankshaft in the chucks by the application of novel power operated mechanism coordinated and interlocked with the cycle of machine operation.

As an exemplary disclosure of the specific application of this invention to machine tools, there is shown, Figure I, a double center drive crankshaft lathe comprising a base or frame 10 to which is fixed a pair of center drive work spindle carrier units 11 and 12. Between these units is located the tool carrying unit 13 and on each side of these units are located the tool carrying units 14 and 15, all of which units are securely connected to the base 10 and interconnected with the sides of the center drive units 11 and 12 so as to form a solid block of metal extending across the lathe, flanked on each side by the side plate members 16 and 17.

Also mounted on the base each side of the center drive work spindle units 11 and 12 are the tailstocks 18 and 19, each of which has the reciprocatable center carrying slides 20 and 21 in which are mounted the respective work engaging centers 22 and 23.

In each of the center drive work spindle carrier units 11 and 12 is journaled the center drive work spindles 24 and 25, upon the periphery of which is provided the ring gears 26 which are connected through idler gears 27, Figures V and IX, to appropriate driving pinions 28 mounted on a common drive shaft 29 journaled in the center drive units 11 and 12. The drive shaft 29 is driven from the main drive motor 30 which drives through belts 31 suitable gearing, indicated generally at 32, Figure IX, which in turn rotates the drive shaft 29 so as to thereby drive the center drive work spindles 24 and 25.

Center drive chucks

In the center drive spindles 24 and 25 are provided the chucking devices or chucks, Figures V, VI, and VII, for gripping the work piece or crankshaft W comprising a pair of swinging arms 33 and 34, each pivotally mounted on suitable pins 35 and 36 fixed to the work spindles. An actuating mechanism contained in the housing 37 is connected through suitable pivotal connections 38 with the arms 33 and 34 and has an operating gearing 39 which may be actuated by wrench socket shafts 40 and 41 having wrench sockets 42 and 43 formed respectively in the ends of shafts 40 and 41. By the application of a suitable wrench to the sockets 42 and 43, the swinging jaws 33 and 34 may be engaged with or disengaged from the crankshaft or work piece W to firmly grip it and hold it on the axis of rotation 44 of the lathe.

Loading, positioning, and chucking work

It is to be particularly noted that there is provided an opening indicated at 45, Figures IV and V, between the clamping arms 33 and 34 of the chucking devices so as to provide a space extending axially of the center drive work spindles. In loading the crankshaft into the center drive chucks, the work spindles are stopped in the position shown in Figures IV and V with the openings 45 substantially above the axis of rotation 44 of the lathe and with the chuck operating sockets 42 and 43 positioned below said axis substantially diametrically opposite said openings 45. A crankshaft W is then placed on the right-hand loading hoist hook 46 which is held in raised position by the loading hoist mechanism indicated generally at 47, which is of conventional design for such crankshaft lathes and operated by a motor 47a. The hoist 47 is arranged to roll horizontally on a suitable track or rail 48 fixed to the machine frame side members 16 and 17 by appropriate bolting means 49.

With the crankshaft W thus initially placed on the hook 46, the hoist 47 is rolled horizontally to the left on the rail 48 until it engages a stop screw 50. At this point, the crankshaft has been moved axially into the center drive work spindles 24 and 25 and is in the openings 45 of the center drive chucks. The motor 47a, Figures IV, V, and VIII, for the loading hoist 47 is then energized to lower the hook 46 to present the crankshaft on the work supporting projections or work rest abutments 51 and 52 formed integral with the respective chuck arm actuating mechanism housings 37. The hook 46 is then swung back out of the way and returned upwardly by reversely energizing the motor 47a and the hoist 47 is then rolled back to the right, withdrawing the hook from the center drive chucks.

When resting on the abutments 51 and 52 in the chucks, the axis of crankshaft W is slightly below the axis of rotation 44 of the lathe. In order to put the crankshaft exactly on center on said axis before gripping the crankshaft in the chucks, the crankshaft has been previously prepared with center holes in its ends which are engaged by the centers 22 and 23 thus lifting the crankshaft up off of the work supporting abutments 51 and 52 and exactly positioning the crankshaft on the axis of rotation of the lathe before the crankshaft is gripped in the center drive work spindles.

The preferred procedure in thus applying the centers 22 and 23 to the crankshaft comprises initially moving the center 22 carried in the tailstock slide 20 into the flange end of the crankshaft by rotating the hand wheel 53 of the left-hand tailstock which is fixed on a shaft 54 suitably journaled in the left-hand tailstock housing 18 and has on its inner end a spiral gear 55 which engages a mating spiral gear 56 fixed to the actuating screw 57 which is journaled against axial movement in suitable bearings 58 in the tailstock housing 18. The threaded portion 59 of the screw 57 operates in a suitable nut 60 rigidly attached by screws 61 to the center slide 20, the slide being mounted in suitable guideways 62 in the tailstock housing 18. The hand wheel 53 is rotated until the center 22 has engaged the flange end of the crankshaft.

The right-hand tailstock center 23 is next engaged with the stub end of the crankshaft by applying fluid pressure to the cylinder 63 on the right-hand tailstock housing 19. Fluid pressure is applied in the chamber 67 to cause the piston 64 and piston rod 65 connected to the tailstock center slide 21 to move in the guideways 66 of the tailstock housing 19 to move the center 23 into the stub end of the crankshaft W. With pressure thus applied behind the center 23, the crankshaft W is normally yieldably urged axially to the left in proper engagement with the center 22 and the operator finally adjusts the exact axial position of the crankshaft in the center drive work spindles by manipulating the hand wheel 53 and observing the usual centering gauge 68 which indicates when the crankshaft is properly positioned.

As soon as the crankshaft is thus properly positioned, both of the tailstock slides 20 and 21 are rigidly locked or clamped to their respective tailstock housings 18 and 19 by fluid pressure clamping mechanism shown best in Figures II, III, and IX. Each of the tailstocks are provided with a clamp member 69 which engages a portion of one of the guide surfaces 66 of the tailstock center slides. A clamping bolt 70 passes down through the clamp 69 and has a threaded end portion 71 about which operates the clamping nut 72 which has an integral arm 73 connected through a pair of toggle links 74 and 75 pivoted together by a pin 76 and pivoted by a pin 77 to the tailstock housing, as best seen in Figure III.

A hydraulic tailstock clamping cylinder 78 is rigidly fixed to the tailstock housing by suitable bolts 79 and has a piston 80 and a piston rod 81 connected by a suitable link 82 to the pin 76 at the middle of the toggle clamp arrangement. Thus, by the application of fluid pressure in the chamber 83 of the cylinder 78, the clamping nut 72 will thus be rotated so as to draw down the screw 70 and the clamp 69 to lock the tailstock slides against axial movement in the guideways 66 in the respective tailstocks. After properly axially positioning the crankshaft by manipulating the hand wheel 53 as described above, fluid pressure is applied in the respective pressure chambers 83 in the tailstock clamping cylinders 78 to firmly lock the centers in position for supporting the work piece during the machining operation.

After the crankshaft W has thus been initially positioned in the lathe on the axis of rotation 44, the chucking devices may now be engaged with the crankshaft webs for supporting and driving the crankshaft intermediate its ends. Each of the socket wrench shafts 40 and 41 for actuating the chucking devices is operated by a unique power mechanism or power chuck wrench contained in each of the tailstock housings 18 and 19. This mechanism comprises an elongated quill 84 slidably mounted against rotation in suitable bearings 85 and 86 formed in the tailstocks 18 and 19. In these quills is journaled the drive shaft 87 on suitable bearings 88, the outer end of this drive shaft being provided with a splined wrench end 89 which may be moved axially into driving engagement with or disconnected from the sockets 42 and 43 of the chuck operating mechanism by reciprocation of the quills 84 in the tailstocks. Reciprocation of the quills is accomplished by manipulating the control levers 90 and 91 carried on the rock shafts 92 journaled in the respective tailstock housings 18 and 19 and upon the inner end of which is fixed a pinion 93 engaging a rack 94 formed on the quill 84.

Driving power for actuating each of the drive shafts 87 and wrench ends 89 when in engagement with the chuck sockets 42 and 43 is provided by means of a hydraulic motor 95 having a shaft 96 which is connected to a gear 97 journaled in suitable bearings 98 carried on the tailstock housings 18 and 19 and which gear 97 in turn drives a mating gear 99 similarly journaled on suitable bearings 100 carried in the tailstock housings. The gear 99 has a splined bore operating in driving engagement with the splined portion 87a of the drive shaft 87 so that driving relationship to the shaft 87 is maintained at all times for any axial position of the quill 84 and the shaft 87.

When it is desired to clamp the crankshaft by the chucking devices, the control levers 90 and 91 are rotated respectively from positions 90a and 91a to positions 90b and 91b, Figure I, so as to move the quills 84 toward the center drive chucks and engage their ends 89 with the chuck operating sockets 42 and 43. Appropriate fluid pressure is then applied to the motors 95 to cause the drive shafts 87 to rotate and move the arms 33 and 34 to grip the crankshaft while centered by the centers 22 and 23 on the axis of rotation 44 of the lathe. After having thus gripped the work in the chucks, fluid pressure is released from the hydraulic motors 95 and the quills withdrawn into the tailstocks by appropriately moving the control levers 90 and 91 back to positions 90a and 91a respectively.

The lathe is then ready for the machining operation to commence and the main drive motor 30 is energized to start rotation of the center drive work spindles 24 and 25. The cutting tools T, best seen in Figure IV, then advanced to machine the desired surfaces upon the crankshaft W and, after the completion of the turning operation, the main drive motor is then de-energized and the work spindles automatically stopped in a predetermined position of exact alignment of the chuck sockets 42 and 43 with the chuck wrench ends 89 of the drive shafts 87 and the quills 84 of the power chucking mechanism in each tailstock.

*Tool feeding mechanism*

Referring particularly to Figure IV, the tools T are carried on a pair of oppositely reciprocatable tool bars 101 and 102 carried in the tool carrying units 13, 14, and 15. The lower tool bars 102 extend along the sides of the center drive chucks and in front of the chuck sockets 42 and 43. In order that the quills 84 may readily engage the wrench ends 89 to operate the chucks, there is provided a clearance opening or hole 103 in the lower tool bars 102 at each side of the center drive chucks so that the tool bars, when moved to retracted position, align the holes 103 for the passage of the quills 84 through the tool bars 102 to engage the chuck sockets 42 and 43 for power clamping or unclamping of the work or crankshafts W.

The tool bars 101 and 102 may be oppositely reciprocatable in feeding motion by a fluid pressure feed cylinder 104, Figure IX, in which operates a piston 105 having a piston rod 106 connected through suitable rack and pinion mechanism 107 to actuate the cam plate 108. This cam plate is mounted between the upper tool bars 101 and the lower tool bars 102 as best seen in Figure IV. Suitable cam slots 109 and 110 in the cam plate 108 control the movement of the tool bars 101 and 102 through appropriate rollers 111 carried on pins 112 fixed in the tool bars. Thrust on the cam plate 108 in the direction of tool bar movement is absorbed by anti-friction roller means 113 and 114 carried on suitable studs 115 fixed to the tool carrier units and center drive units 11, 12, 13, 14, and 15. It is to be noted that the cam plate 108 lies between the tool bars 101 and 102 and moves in a direction normal to the direction of feeding movements of the tool bars and cutting movements. This arrangement provides an unusually rigid and efficient tool feeding mechanism for the machine which is free of vibration and chatter and is also simple in construction

Unchucking and unloading work

After the completion of the machining cycle and the chucks have stopped in the position indicated in Figures IV and V and the tool bars 101 and 102 have been retracted to withdrawn position by the cam plate 108 by appropriately applying fluid pressure in the cylinder 104, the work is then ready to be unloaded from the machine. The chucks are then unclamped by again manipulating the control levers 90 and 91 to the respective positions 90b and 91b so as to again engage the chuck sockets 42 and 43. The hydraulic motors 95 are then operated in the reverse direction to unclamp the swinging arms 33 and 34 of the chucks from the crankshaft W. Having accomplished this, the levers 90 and 91 may be left in positions 90b and 91b for again clamping a new work piece in the chucks after the finished work piece has been removed from the lathe.

The left-hand hoist 116 is then moved up against the stop 120 with its hook 117 projecting into the space 45 in the center drive chucks. The hook 117 is then lowered by appropriately energizing the left-hand hoist motor 116a, Figure VIII, so as to engage the hook 117 around the crankshaft W. The centers 22 and 23 are retracted from the work by first releasing the tailstock clamping mechanism by applying fluid pressure in the chamber 118 behind the piston 80 of the cylinder 78, Figure III, to release the toggle clamps and thereby release the tailstock center slides 20 and 21. Fluid pressure is then applied in the chamber 119 of the right-hand tailstock slide actuating cylinder 63 so as to withdraw the center 23 from the crankshaft. The left-hand center 22 is then withdrawn by appropriately turning the hand wheel 53 allowing the crankshaft to drop down on the work rests 51 and 52 in the chucks.

Power is then applied in a reverse direction to the motor 116a of the left-hand hoist 116 to raise its hook 117, lifting the crankshaft off the work rest abutments 51 and 52 into the spaces 45. The left-hand hoist may then be moved from the spaces 45 to the left withdrawing the crankshaft outwardly from the chucks to the unloading position shown in Figure I, where the finished crankshaft is lifted from the hook.

General machine operation

Summarizing the operation of the machine, the operator first places the crankshaft W on the right-hand hoist hook 46 and moves the hoist into the center drive chucks to a predetermined position defined by the stop screw 50. At this time, the center drive chucks are stopped with the loading spaces 45 positioned substantially above and to one side of the axis of rotation of the lathe. The crankshaft is then lowered to substantially aligned position with the work spindle axis on work rests provided in the chucks. The work piece is then picked up by the centers and located in proper axial position and in proper alignment with the work spindle axis. The power chucking mechanism is then applied to the chucks through the tool bars each side of the center drive chucks and operatively engaging the chuck mechanism substantially diametrically opposite the loading spaces 45 provided for loading the crankshaft into the center drive chucks. The alignment of the center drive chucks in a predetermined circumferential position of stopping is done automatically so that the power chucking mechanism in each of the tailstocks may automatically engage the chuck mechanism and clamp the work in the chucks. This contemplates the provision of power chucking mechanism which may pass through the lower tool bars having passageways which also automatically align themselves with the power chucking mechanism at the conclusion and stopping of the work cycle. And it is then the procedure to reverse this process in unloading the crankshaft from the machine and preferably utilizing a second loading hoist to increase the efficiency and production of the machine.

Hydraulic operating mechanism

In order to operate the machine in the most efficient manner, it is preferable to utilize a hydraulic fluid pressure operating system illustrated in the diagram, Figure IX. This system receives its source of fluid pressure from a hydraulic fluid pressure pump 121 driven by a hydraulic pump motor 122. The pump 121 receives its supply of fluid from the fluid reservoir 123 through a suction line 124 and transmits pressure into the pressure line 125.

Tailstock center operating mechanism

The sequential movements of the right-hand tailstock center 23 by the cylinder 63 and the toggle clamps for the tailstocks as operated by the cylinders 78 is controlled by a three-position control valve 126 having a control lever 126d movable to positions 126a, 126b, and 126c. When the control valve lever 126d is moved to the position 126a, the center 23 is retracted from the work crankshaft and the toggle clamps are released from the tailstock center slides 20 and 21. Under these conditions, fluid pressure from the line 125 passes through the valve 126 into the line 127, entering the pressure chambers 118 of the cylinder 78 to release the toggle clamps, while the line 128 is connected through the valve 126 to the drain line 129 for return of fluid to the reservoir 123 from the chambers 83 in the cylinders 78. At the same time, when the valve is in the position 126a, fluid pressure from the line 125 is also connected to line 130 which is connected to the pressure chamber 119 of the cylinder 63 so as to cause withdrawal of the center 23 while discharge fluid from the chamber 67 of the cylinder 63 passes out through the line 131, relief valve 132, and the line 133, through the valve 126 into the drain line 129.

When the lever 126d is moved to position 126b, the center 23 is moved into engagement with the crankshaft W while the tailstock slides 20 and 21 remain unclamped so that they may be moved in the tailstock while pressure is being applied in the chamber 67 of cylinder 63 by manipulation of the hand wheel 53 as described. Under these conditions, fluid pressure from the line 125 passes through the valve 126 into the line 133, through the valve 132 and the line 131 into the chamber 67 of the cylinder 63 while fluid is discharged from the pressure chamber 119 out through the line 130, through the valve 126 into the drain line 129. At the same time, the toggle clamping cylinders 78 are maintained in released position by fluid pressure being applied from the line 125 through the valve 126 to the line 127, while the line 128 is connected through the valve 126 to the drain line 129. Thus position 126b for the valve lever 126d serves for the initial axial adjustment of the crankshaft in the lathe by the hand wheel 53.

After the work has been properly positioned on the centers and in the center drive chucks, the valve lever 126d is then moved to the position 126c, whereupon fluid pressure now passes from the line 125 through the valve 126 into the line 133, through valve 132 and line 131 into the cylinder chamber 67. A relief valve 134 connected into line 131 together with the valve 132, both of which are connected to the drain line 129, serves to maintain the proper pressure behind the center 23 commensurate with the proper running engagement of the crankshaft on the centers and to prevent distorting the crankshaft during the initial engagement of the centers 22 and 23. The toggle clamps are also applied to lock the tailstock center slides 20 and 21 to their respective tailstock housings 18 and 19 by fluid pressure which now passes through the valve 126 into the line 128 to the cylinders 73 while discharge from these cylinders passes out through the line 127 and the valve 126 to the drain line 129. Thus, when the valve lever 126d is in this final position 126c, the centers have been properly engaged in the work and the tailstock center slides rigidly clamped in the tailstock housings 18 and 19.

Power chucking mechanism operation

The hydraulic driving motors of the power chucking mechanism for actuating the drive shafts 87 when engaged with the chuck sockets 42 and 43 are controlled by means of the solenoid valves 135 and 136, each of which valves has a neutral or shut-off position and operative positions to each side for effecting rotation of the motors 95 in one direction or the other by fluid pressure. The valve 135 has a solenoid 137 which, when energized, connects fluid pressure from the line 125 to the line 138 connected to the motor 95 for the left-hand tailstock power chucking mechanism. At this time the line 139 from this motor is connected through the valve 135 to the drain line 140 to effect rotation of the motor to drive the socket shaft 40 of the left-hand center drive chuck to clamp the crankshaft therein.

The valve 135 also has a solenoid 141 which operates the valve so as to connect pressure from the line 125 to the line 139 and connect the return line from motor 95 through the valve 135 to the drain line 140 to effect the reverse operation of the motor to unclamp the chucking device in the left-hand center drive chuck.

In a similar way, the solenoid 142 of the other chuck operating control valve 136 when energized causes pressure to be connected through the line 143 to the hydraulic motor 95 of the right-hand tailstock while connecting the return line 144 to the drain line 145 through the valve 136 to effect clamping of the right-hand center drive chuck on the crankshaft. And when the solenoid 146 of the control valve 136 is energized, pressure will then be applied from the line 125 through the line 144, while the line 143 is connected to the drain line 145 for unchucking the crankshaft in the right-hand center drive chuck.

Spindle braking and stop operation

In order to automatically control the slowing down and stopping of the center drive work spindles in the predetermined position indicated in Figures IV and V so as to present the loading spaces 45 in proper position relative to the hooks of the loading hoists and at the same time present the chucking sockets 42 and 43 in proper alignment with the holes 103 in the tool bars 101 and 102 and with the chucking quills in the tailstocks, there is provided a hydraulic braking mechanism comprising a control valve 147, Figure IX, actuated by a solenoid 148, the valve receiving a pressure supply from the line 125. When the machine is started and operating in turning a crankshaft, the solenoid 148 of the valve 147 is de-energized while the solenoid 149 of a control valve 150 is energized. Under these conditions, a fluid pressure braking and stop motor 151 connected to the shaft of the motor 30 will circulate fluid out through the line 152 directly through the valve 153 and return to the pump through the line 154 for free rotation of the pump 151 by the motor 30 while operating at full-rated speed during the cutting operation of the machine. The valve 153 will, at this time, be connected through a line 155 through the valve 150 to the drain line 129. The circuit between the braking motor 151 and the relief valve 153 is supplied by a supercharge pressure line 156 connected to the line 154 and receiving a pressure supply of a predetermined value through the pressure relief valve 157 interconnecting the line 156 and the main pressure supply line 125, bypass of fluid from the relief valve 157 being connected to the drain line 129.

When it is desired to start the braking action to stop the work spindles for loading and unloading the machine, the power is disconnected from the main drive motor 30 and the solenoid 149 of the valve 150 is de-energized and the solenoid 148 of the valve 147 is energized. When the solenoid 149 is de-energized, the relief valve drain connection through the line 155 is blocked off, causing this valve to set up a restriction to flow between the lines 152 and 154 to thereby effect a braking action so as to restrict rotation of the motor 30 and slow it down. When the solenoid 148 of the valve 147 is energized, the outlet connection through the line 158 from the metering valve 159 is connected to the drain line 129 through the valve 147 and the supply pressure from the line 125 is connected through the valve 161, which is held open at this time by the braking back pressure through the line 162 so that this pressure is shunted around the valve 161 and through the check valve 161a to the line 156. At this time, the hydraulic motor will decelerate with a braking torque equivalent to the pressure setting of the valve 153 until its speed is reduced to the point where the displacement of the braking motor 151 equals the flow setting of the valve 159. The braking pressure in the line 162 will then disappear, allowing the valve 161 to close so that the pump supply from the line 125 builds up pressure to drive the hydraulic motor 151 at a predetermined slow speed or jogging rate through the valve 157 and the line 156, fluid at this time passing through the line 162, through the valve 159, the line 158 through the valve 147, into the drain line 129. The pressure setting of the valve 161 is set slightly higher than the back pressure set up by the valve 159 so that the valve 161 will remain closed during rotation of the hydraulic motor 151 and the main drive motor and work spindles connected thereto at the predetermined slow speed or jogging speed.

When it is desired to bring the work spindles and the driving motor 30 to definite stopped position for loading and unloading the crankshafts in the machine, both of the solenoids 148 and 149 of the respective control valves 147 and 150 are de-energized. This allows the valve 147 to move to a position where all ports are blocked so as to stop rotation of the braking motor 151 since the line 158 from the metering valve 159 is now positively closed off and the control line 162 is also closed off at the valve 161. Likewise, the line 155 is closed off by the valve 150 at this time. The motor circuit, however, is continuously supplied with a reduced supercharged pressure from the line 156 through the valve 157 connected to the main supply line 125 as described to make up for any leakage in the braking motor 151 and associated circuit.

When the solenoid 148 is de-energized and the solenoid 149 is energized, the machine is in condition for full speed operation of the work spindles by the motor 30, the braking motor 151 in no way interfering with the free rotation of the motor 30 at this time. When it is desired to slow down the motor to a predetermined speed, or when it is desired to operate the work spindles at a slow jogging speed with the main drive motor de-energized, in both cases solenoid 148 is energized while solenoid 149 is de-energized. Finally, when it is desired to bring the machine to a definite stop, both solenoids 148 and 149 are de-energized.

*Work spindle positioning mechanism*

Associated with the above braking and stopping mechanism is an indexing or positioning plunger 174, Figure IX, for the center drive work spindles. The plunger 174 is actuated by a hydraulic cylinder 175 and engages a notch in a disc 176 fixed to the drive shaft 29 for the center drive gears 24 and 25. A control valve 177, receiving a pressure supply from the line 125, will connect pressure through the line 178 to the cylinder 175 to insert the plunger 174 into the notch in the indexing disc 176 as the disc rotates the notch into position of engagement by the plunger 174. This condition pertains when the solenoid 179 of the valve 177 is energized. Return of fluid from the cylinder 175 under these conditions passes out through the line 180 through the valve 177 into the drain line 129. When the solenoid 179 of the valve 177 is de-energized, pressure will then be applied through the line 180 to withdraw the plunger 174 from the notched disc 176, while fluid is discharged from the cylinder 175 through the line 178 into the drain line 129.

*Tool feeding operations*

The tool feeding mechanism of the lathe which is actuated by the main feed cylinder 104, Figure IX, is controlled in its various feed and rapid traverse movements in both directions by a fluid pressure control valve mechanism 163 which receives its source of fluid pressure supply from the pressure line 125. A forward feed pressure chamber 164 of the cylinder 104 is connected through a line 165 to the control valve mechanism 163 while the return pressure chamber 166 of this cylinder is connected through a line 167 to the control valve mechanism 163.

A pair of operating and control solenoids 168 and 169 are provided for this control valve mechanism 163. When it is desired to rapid traverse the tools forward at the beginning of a cutting cycle, both solenoids 168 and 169 are energized. This applies a rapid and large flow of fluid pressure from the line 125 to the line 165 to actuate the piston in the cylinder 104 in forward rapid traverse movement while discharge from the cylinder 104 passes out through the line 167, through the control valve 163 into the drain line 129. To effect forward feeding movement, solenoid 168 remains energized while the solenoid 169 is de-energized so that the control valve 163 reduces the volume of flow through the lines 165 and 167 to thereby effect the reduced feeding movement to the cutting tools.

At the completion of the forward feed movement, rapid return movement of the tools is effected by de-energizing solenoid 168 and energizing solenoid 169 so as to adjust the valve mechanism 163 to now connect fluid pressure from the line 125 through the line 167 into the pressure chamber 166 of the cylinder 104 while fluid pressure is discharged out of the chamber 164 and the line 165 into the drain line 129. When the tools are in retracted stopped position, both solenoids 168 and 169 are de-energized so as to cut off fluid supply from the pressure line 125 from both of the lines 165 and 167.

A supplemental rapid traverse movement under independent manual control may be effected by the control valve 170 having a control solenoid 171 which, when energized, connects a line 172 to the drain line 129. Under these conditions, fluid may escape from the line 167 through a metering valve 173 to the drain line 129 to effect a continuation of the rapid traverse movement after the rapid traverse movement has been stopped and the feed movement automatically instituted. The purpose of this arrangement is to permit the tools to be traversed in by the operator at an intermediate rate of travel between the normal rapid traverse movement and the feed movement until the tools just begin to cut so as to attain a maximum output from the machine when great variation in the work piece necessitates beginning the actual cutting at different radial distances relative to the work spindle axis.

*Electrical control mechanism*

Preferably, the control and interlocking of the various machine functions and operations described above is most efficiently done by the utilization of electrical apparatus. In applicants' present arrangement, the power lines 181, 182, and 183 for the electrical control system are connected by a main disconnect switch 184 with a source of power indicated generally at 185 which supplies the main current for operating the main drive motor 30, the hydraulic pump motor 122 and lubricating pump motor 122a and the loading hoist motors 47a and 116a. In this particular instance these motors are three phase A. C. type connectible to the three phase power supply circuit comprising the lines 181, 182, and 183. Control current for the electric control mechanism for the above motors and other control functions of the machine is taken off through the primary leads 186 and 187 of a control circuit transformer having a primary winding 188 and an isolated secondary winding 188a whose secondary is connected to the control leads 189 and 190.

The right-hand hoist motor 47a may be operated to lower the hook 46 to position the crankshaft on the work rests 51 and 52 by pressing the push button 191 which completes the circuit from lead 189 through lead 192, through normally closed contact 193a, lead 194, and contactor 195 to the lead 190, energizing contactor 195, opening control contact 195a and closing power contacts 195b, connecting the motor 47a to the power supply leads 181, 182, and 183 to connect the motor to lower the hook 46. In order to raise the hook 46, push button 196 is pressed which completes a circuit from lead 189 through lead 197, normally closed control contact 195a, lead 198, contactor 193, to the lead 190, energizing contactor 193 to open control contact 193a and closing power contacts 193b to energize the motor 47a to raise the hook 46 of the hoist 47.

Similarly, pressing push button 199 lowers the left-hand hook 117 by completing a circuit from lead 189 through lead 200, normally closed control contact 201a, lead 202, and contactor 203 to the lead 190, energizing the contactor 203 to effect opening of the control contact 203a while closing the power contacts 203b. In order to raise the left-hand hoist hook 117, the push button 204 is pressed, completing a circuit from the lead 189 through the lead 205, control contact 203a, lead 206, and contactor 201, to the lead 190, energizing the contactor 201 to open control contact 201a while closing the power contacts 201b.

Each of the operating motors 47a and 116a for the work loading and unloading hoists is provided with a respective magnetic brake 47b and 116b. When either of the motors 47a or 116a are energized, their corresponding brake is energized through leads 47c and 116c so as to be released. When these motors are deenergized, the respective brake is also de-energized to brake and grip the motor shaft to prevent the load from overhauling and continuing rotation of the motors to thus quickly stop and hold the hoist hooks in any desired position.

The left-hand center drive chuck is clamped to the work by energizing solenoid 137 of the valve 135 by pressing the push button 207 to complete a circuit from the lead 189 through the lead 208, normally closed control contact 209a, lead 210, and relay 211, to the lead 190, which energizes relay 211 to open control contact 211a and closes control contact 211b which completes a circuit from the lead 189, through the lead 212 and solenoid 137, to the lead 190, energizing solenoid 137 to operate the valve 135 to connect fluid pressure to the motor 95 to clamp the left-hand chuck on the work. To unchuck the left-hand center drive chuck, push button 213 is pressed, completing a circuit from the lead 189, through the lead 213a, through the normally closed control contact 211a, and the lead 214, through the relay 209, to the lead 190 to energize relay 209, opening control contact 209a and closing control contact 209b which in turn completes a circuit from the lead 189, through the lead 215, through the solenoid 141, to the lead 190, energizing the solenoid 141 to operate the valve 135 to connect fluid pressure to the motor 95 to unclamp the left-hand center drive chuck.

In a similar way, pressing push button 216 completes a circuit from the lead 189, through the lead 217, the normally closed control contact 218a, and the lead 219, through the relay 220, to the lead 190, energizing the relay 220 to open the control contact 220a and closing the control contact 220b to thereby complete a circuit from the lead 189, to the lead 221 and the solenoid 142, to the lead 190, thus energizing the solenoid 142 to operate the valve 136 to direct fluid pressure to the motor 95 to effect clamping of the right-hand center drive chuck. By pressing the push button 222, a circuit is completed from the lead 189, through the lead 223, the control contact 220a and the lead 224, through the relay 218, to the lead 190, effecting opening of the control contact 218a while closing the control contact 218b so as to complete a circuit from the lead 189 through the lead 225, through a solenoid 146, to the lead 190 to operate the valve 136 to cause fluid pressure to operate the motor 95 to unchuck the right-hand center drive chuck.

The hydraulic motor 122 for operating the fluid pressure pump 121 is started by pressing the hydraulic pump start button 226, completing a circuit from the lead 189, through the hydraulic motor stop push button 227, lead 228, the lead 229, through the contactor 230, to the lead 190, thus energizing the contactor 230, closing the hold-in contact 230a so as to maintain the contactor 230 energized after the start button 226 is released. Energizing contactor 230 also closes contact 230b which connects the lead 189 to the lead 189a to render the remainder of the spindle and feed control mechanism operative. The power contacts 230c are thus also closed to connect power to the hydraulic pump motor 122. Fluid pressure is then being delivered to the hydraulic system from the pump 121. The hydraulic system may readily be rendered inoperative by pressing the hydraulic motor stop button 227 so as to de-energize contactor 230, opening the hold contact 230a and also opening contact 230b to cut out the remainder of the spindle motor and feed electric control mechanism and opening power contacts 230c.

With the hydraulic system operating by energizing contactor 230 as described, the main drive motor 30 may be started by pressing the run button 231 which completes a circuit from the lead 189a through the main drive motor stop button 232, the lead 189b, through the limit switches 233, 234, 235, 236, 237, and 238, to the lead 239, and the lead 240, through the relay 241, to the lead 190, to thereby energize the relay 241, providing all of the limit switches 233 to 238 inclusive are closed.

Limit switches 233 and 234 are closed only provided both of the respective loading hoists 116 and 47 have been moved to their extreme out positions to engage these limit switches on the rail 48 so as to prevent operation of the work spindles unless the hooks 117 and 46 are completely out of the center drive work spindles. Limit switches 235 and 236 are respectively closed by the control levers 90 and 91 when moved to positions 90a and 91a of full retraction of the power chucking quills so that the work spindles can not be rotated unless the chucking quills are fully removed from engagement with the chuck sockets 42 and 43 and fully removed from the openings 103 in the lower tool bars 102. The limit switch 237 is associated with the positioning gauge 68 which engages the crankshaft W when adjusting the centers 22 and 23 as described and will only be closed when the gauge is swung back away from the crankshaft. The limit switch 238, Figure IX, is operated by the position of the locking plunger 174 and is only closed for rotation of the work spindle when the locking plunger is in retracted position away from the notched disc 176.

Energizing relay 241 closes contact 241a to energize relay 242. At the same time, contact 241b is closed. Contacts 241c and 241d are respectively opened and closed. Energizing relay 242 closes holding contact 242a to maintain the relay 242 energized. At the same time, contact 242b is closed to energize relay 243. Contact 242c is also closed by energizing relay 243. Relay 243 is thus energized, closing contact 243a and also closing contact 243b. The closing of contacts 241b and 242b energizes the main drive motor contactor 244 which in turn closes the holding contact 244a to maintain the contactor 244 energized, which closes the power contacts 244b, connecting the main drive motor 30 to the power supply lines 181, 182, and 183.

Energizing contactor 244 opens contact 244e to de-energize the braking and spindle positioning circuit when the main drive motor is being supplied with power. Also, when the main drive motor is running by energizing this contactor 244, contacts 244c and 244d are closed to allow the tool traverse and feeding movements to take place.

With the main drive motor energized and rotating the center drive work spindles, the machine may be set for either manual or automatic operation. Assuming the machine is set for manual operation by adjusting the selector switch 245 to the manual position connecting lead 246 with lead 247, the tools in push button 248 is pressed, completing a circuit from the lead 189b through the lead 249, contact 244d, through the relay 250, to the lead 190, so as to energize the relay 250, closing contact 250a to complete a circuit from the lead 189, through the lead 251, limit switch 252, lead 253, through the solenoid 171 of the manual traverse control valve 170, and to thereby open this valve to effect the intermediate tools traverse in movement for the cutting tools.

When the tools in push button is pressed, its associated contact 248a opens to maintain the relay 254 de-energized so that its contact 254a remains closed and its contact 254b remains open. In order to continue the tools in movement under manual setting of the selector valve 245, the tools in button must be held depressed manually for the desired distance of tool travel. As soon as the tools begin to cut on the work, the tools in button 248 is released. As the tools feed down to a predetermined relative position toward the work, a limit switch 252 is opened to de-energize solenoid 171 of the valve 170 so as to automatically prevent further manual infeeding as the tools begin to cut on the work. The trip dog 255 is adjusted to cancel the tools slow traverse in push button control at the innermost safe limit of possible engagement of the cutting tools with the work piece. The tools in button is then again pressed while the dog 255 continues to maintain the limit switch 252 open but closing its contact 252a so as to energize the relay 250 to close contact 250b and thereby energize relay 256 which opens the contact 256a and closes the holding contact 256b and also closes the contact 256c which completes a circuit from the lead 189 through the lead 257 and the solenoid 168, to the lead 190, and also closes the contact 256d, completing a circuit from the lead 189, through the lead 258, limit switch 259 and lead 260, to the solenoid 169 so as to adjust the feed control valve 163 to cause forward rapid traverse movement of the cutting tools to the work. The limit switch 259 is automatically operated by a dog 261 subject to tool movement so as to actuate the limit switch 259 at a predetermined point of in movement of the tools so as to de-energize solenoid 169 of the control valve 163 to change from forward rapid traverse movement to the feed movement for the tools.

When the operator desires to rapid return or withdraw the tools from the work, he may press the tools out push button 262 so as to energize the relay 254 which in turn opens contact 254a and closes contact 254b so as to energize the solenoid 169 of the control valve 163. The opening of contact 254a de-energizes relay 256 and opens contact 256c to de-energize the solenoid 168 of the valve 163, the result being rapid traverse return movement for the tools.

When it is desired to operate the machine in an automatic cycle, the selector switch 245 is set in the automatic position. The operator then depresses the tools in button 248 and holds it depressed as the tools move in with both solenoids 168 and 169 of the valve 163 and the solenoid 171 of the valve 170 energized for the rapid traverse movement to initial contact position of the tools with the work. The dog 255 then trips limit switch 252 and de-energizes solenoid 171 to thereby cut out the manual rapid traverse and institute a slower rapid traverse movement. When the limit switch 259 is actuated by the dog 261, the solenoid 169 is de-energized, changing the tool movement to slow feeding speed. At the end of the infeed movement of the tools, a dog 263 engages the limit switch 264, opening the connection between lead 247 and lead 246 so that when a dog 266, carried by the rotating work spindles, engages a limit switch 267 to open this limit switch the contactor 244 will be de-energized, opening the power contacts 244b to de-energize the main drive motor 30 at a predetermined point of rotation of the work spindles determined by the circumferential position of the dog 266 on the work spindles.

De-energizing the main drive motor contactor 244 closes contact 244e, completing a circuit through the run button contact 231a to the lead 268, through contact 242c now closed, limit switch 246a now closed, normally closed contact 269c, and the relay 270 to the lead 190, to thus energize the relay 270, opening contact 270a to de-energize relay 269 and to close contact 270b and to close contact 270c to energize the solenoid 148 of the valve 147 with the result that the braking motor 151 will decelerate the momentum of the main drive motor and work spindles attached thereto as described. A contact 270d is also closed when the relay 270 is energized. As the main drive motor 30 decelerates to a predetermined slow speed, a zero speed control switch 271 closes its contacts at and below the predetermined desired speed setting for the work spindles. Closing of the zero speed control switch 271 renders a limit switch 272 effective so that when this limit switch 272 is actuated by a dog 273 carried by the rotating work spindles, the relay 274 will be energized which closes the holding contact 274a and also closes the contact 274b and the contacts 274c and 274d. The closing of contact 274b energizes the solenoid 179 to move the positioning or indexing plunger 174 into the notched indexing disc 176, while the hydraulic braking motor 151 is slowly rotating the main drive motor and work spindles at the predetermined slow jogging speed until the plunger drops in the index disc to accurately position the work spindles. When the lock pin goes in it opens limit switch 238 but power is held on the hydraulic motor until limit switch 252a is opened by the tools backing out, thus de-energizing relay 270 to operate valve 147 to remove pressure on the hydraulic motor 151. When the main drive motor is again energized by pressing the run button, the run button contact 231a automatically de-energizes the relay 274 so as to withdraw the locking plunger.

The slow rotation of the work spindles and main driving motor at jogging speed by the hydraulic braking motor 151 may be effected when the main drive motor is de-energized by pressing the jog button 275 which energizes relay 241, closing contact 241d momentarily in accordance with the movement of the jog button to energize or de-energize the relay 270 and thereby control the opening and closing of the contact 270c and the operation of the solenoid 148 of the valve 147 to supply fluid pressure to the motor 151 for operating the work spindles at the predetermined slow jogging speed.

When the main drive motor is again energized at the beginning of another work cycle, the relay 269 is energized by the closing of contact 243b, thereby closing contact 269c so as to energize solenoid 149 and maintain it energized during the application of power to the main drive motor and, at the same time, contacts 269a and 269b are opened so as to maintain the relays 270 and 274 de-energized.

When it is desired to instantly stop the machine in an emergency to prevent damage or accident to the cutting tools and work, the stop button 232 is pressed, de-energizing contactor 244 to de-energize the main drive motor 30. De-energizing contactor 244 also opens contacts 244c and 244d, de-energizing respectively the relays 256 and 260 to bring the forward tool feeding and traverse movements to a halt. Tools out push button 262 may then be pressed to rapidly withdraw the tools by energizing the relay 254. By holding the jog button 275 depressed, the work spindles will be rotated by the hydraulic braking motor 151 at the predetermined slow jogging speed and the main drive motor and spindles then stopped at any point by immediately releasing the jog button.

In order to stop the spindles in the loading position, the jog push button 275 is held down and also the stop button 232 held depressed so as to close the stop button contact 232a so as to energize the relay 274 to insert the positioning or indexing plunger 174 and thereby stop the work spindles in the predetermined loading position. The jog button 275 is then released to bring the machine to rest.

As the cutting tools retract to withdrawn position and the limit switch 252 is relieved from contact with the dog 255, its contact 252a opens to thereby automatically de-energize the relay 270 which opens contact 270c to de-energize solenoid 148 after the positioning plunger 174 has engaged properly in the indexing notch in the disc 176. It will also be noted that the normally closed contact 238a of the limit switch 238 will open when the locking plunger 174 is inserted after the final positioning of the work spindles so that the tools out relay 254 will be automatically energized to withdraw the tools at the completion of a work cycle and after the spindles have been brought to the predetermined loading position.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claim are intended to be included herein.

Having thus fully set forth and described this invention, what is claimed as new and desired to be secured by United States Letters Patent is:

In a center drive lathe having a base, a rotatable center drive spindle on said base, means for stopping said spindle in a predetermined position including driving means for rotating said spindle, a tailstock on said base, a tool feeding device on said base located between said spindle and said tailstock, a center in said tailstock located on the axis of rotation of said spindle, the combination of a chuck in said spindle having a work loading opening to one side of said axis to facilitate axial loading of a work crankshaft over said tailstock into or out of said chuck when the spindle is stopped in said predetermined position, an operating wrench socket on said chuck located below said opening and axis of rotation of the spindle when the spindle is stopped in said predetermined position, a power wrench mounted in said tailstock below said axis and movable parallel to said axis to engage said operating socket of the chuck, means for actuating said tool feeding device to and from a retracted position relative to said axis, and a passageway formed in said tool feeding device located so as to align itself with said operating socket and said power wrench when said tool feeding device is in retracted position to allow passage of said power wrench through said tool feeding device to engage said socket, and interlock mechanism operable by the movement of said power wrench into engagement with said socket to prevent rotation of said spindle by said driving means and the actuation of said tool feeding device from retracted position.

WALTER R. MEYER.
HAROLD J. SIEKMANN.

REFERENCES CITED

The following references are of record in the file of this patent:

UNITED STATES PATENTS

| Number | Name | Date |
|---|---|---|
| 2,069,107 | Groene | Jan. 26, 1937 |
| 2,103,298 | Pierle | Dec. 28, 1937 |
| 2,141,466 | Groene | Dec. 27, 1938 |
| 2,191,935 | Groene | Feb. 27, 1940 |
| 2,215,922 | Groene | Sept. 24, 1940 |
| 2,391,154 | Groene | Dec. 18, 1945 |
| 2,450,096 | Siekmann | Sept. 28, 1948 |